(12) United States Patent
Bae et al.

(10) Patent No.: US 10,293,807 B2
(45) Date of Patent: May 21, 2019

(54) POWER CONTROL SYSTEM AND METHOD FOR HYBRID VEHICLE

(71) Applicant: Hyundai Motor Company, Seoul (KR)

(72) Inventors: Su Hyun Bae, Daegu (KR); Hong Geuk Park, Chungcheongnam-Do (KR); Sung Kyu Kim, Gyeonggi-Do (KR); Mu Shin Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 15/400,047

(22) Filed: Jan. 6, 2017

(65) Prior Publication Data

US 2017/0369049 A1 Dec. 28, 2017

(30) Foreign Application Priority Data

Jan. 7, 2016 (KR) .................. 10-2016-0001965
Jan. 2, 2017 (KR) .................. 10-2017-0000433

(51) Int. Cl.
*B60K 6/44* (2007.10)
*F16H 3/72* (2006.01)
*H02P 1/56* (2006.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
CPC ....... H01L 2924/00; H01L 2924/00014; H01L 2924/0002; Y02T 10/7005; H02T 10/7077
See application file for complete search history.

(56) References Cited

U.S. PATENT DOCUMENTS

2010/0316922 A1* 12/2010 Hamada .................. B60L 1/003
   429/432
2011/0095603 A1* 4/2011 Lee ...................... B60L 11/1803
   307/10.1
(Continued)

FOREIGN PATENT DOCUMENTS

JP    2004-357412 A    12/2004
JP    2007-097287 A     4/2007
(Continued)

OTHER PUBLICATIONS

Translation of JP2012232690 has been attached.*

*Primary Examiner* — Shawki S Ismail
*Assistant Examiner* — Zoheb S Imtiaz
(74) *Attorney, Agent, or Firm* — Mintz Levin Cohn Ferris Glovsky and Popeo, P.C.; Peter F. Corless (57) ABSTRACT

A power control system for a hybrid vehicle is provided. The system includes a high-voltage battery that is capable of being charged or discharged, a first motor and a second motor, a first inverter connected to the first motor, and a second inverter connected to the second motor. Additionally, a converter has a first side connected to the battery and a second side connected in parallel to the first inverter and the second inverter and a diode is connected in parallel to both sides of the converter. A controller is configured to operate the converter and the first and second inverters to cause electric power of the high-voltage battery to be bypassed via the diode and directly supplied to the first inverter or the second inverter.

14 Claims, 8 Drawing Sheets

(51) Int. Cl.
*B60K 6/365* (2007.10)
*B60W 10/06* (2006.01)
*B60W 10/08* (2006.01)
*B60W 10/26* (2006.01)
*B60W 20/15* (2016.01)
*B60W 20/30* (2016.01)
*H02M 7/537* (2006.01)
*H02P 5/753* (2006.01)
*B60W 10/115* (2012.01)

(52) U.S. Cl.
CPC .......... *B60W 10/115* (2013.01); *B60W 10/26* (2013.01); *B60W 20/30* (2013.01); *H02P 1/56* (2013.01); *H02P 5/753* (2013.01); *B60K 6/365* (2013.01); *B60K 6/44* (2013.01); *B60W 2510/085* (2013.01); *B60W 2710/242* (2013.01); *F16H 3/727* (2013.01); *H02M 7/537* (2013.01); *Y10S 903/93* (2013.01)

(56) References Cited

U.S. PATENT DOCUMENTS

| | | | |
|---|---|---|---|
| 2013/0200699 A1* | 8/2013 | Origane | B60R 16/03 307/10.6 |
| 2015/0105202 A1* | 4/2015 | Park | B60K 6/445 475/5 |
| 2017/0129474 A1* | 5/2017 | Sato | B60W 10/08 |
| 2017/0274777 A1* | 9/2017 | Alam | B60L 11/02 |

FOREIGN PATENT DOCUMENTS

| | | | |
|---|---|---|---|
| JP | 2012232690 | * | 11/2012 |
| JP | 2015-163042 | A | 9/2015 |
| KR | 10-2010-0085791 | A | 7/2010 |
| KR | 10-2012-0005747 | | 1/2012 |

* cited by examiner

POWER CONTROL SYSTEM AND METHOD FOR HYBRID VEHICLE

CROSS-REFERENCE TO RELATED APPLICATION

This application claims the priority benefits of Korean Patent Application No. 10-2016-0001965, filed on Jan. 7, 2016 and Korean Patent Application No. 10-2017-0000433, filed on Jan. 2, 2017 in the Korean Intellectual Property Office, the disclosure of which are incorporated herein by reference.

BACKGROUND

1. Field of the Invention

The present invention relates to a power control system and method for a hybrid vehicle, and more particularly, to a power control system and method for a hybrid vehicle capable of improving fuel economy of the hybrid vehicle by generating motor driving power higher than a power limit of a converter.

2. Description of the Related Art

Recently, as environmental pollution and resource exhaustion problems have increased, ecofriendly vehicles have been actively developed. In particular, hybrid vehicles which satisfy enhanced exhaust gas regulations of vehicles and provide improved fuel economy have been developed. A hybrid vehicle generates electricity via regenerative braking for counter rotating a motor upon deceleration of the vehicle to charge a battery and improves fuel economy and reduces exhaust gas via idle stop and go control for stopping an engine upon stopping the vehicle and restarting the engine using the motor upon starting the vehicle.

Accordingly, in the hybrid vehicle, the safe mode of the vehicle should be controlled based on the state of the vehicle. In particular, research regarding technology of outputting higher power in an electric vehicle (EV) mode without aid of the engine has been conducted. Currently, power performance of a converter has increased to satisfy power gradually increased in the EV mode.

A technology of the related art discloses a motor control apparatus for connecting a diode and a resistor to a converter in parallel to suppress rush current generated upon regeneration, processing regeneration energy via the resistor when the voltage of a capacitor exceeds a predetermined value and processing regeneration energy via the diode and the resistor when the voltage of the capacitor is equal to or less than the predetermined value, thereby increasing converter efficiency.

However, when power performance of the converter is improved, the amount of current flowing in the converter increases. As a result, the size of an inductor, a power module and a cooling apparatus associated with the converter increase, thereby increasing the cost, weight and volume of the converter.

The matters disclosed in this section are merely for enhancement of understanding of the general background of the invention and should not be taken as an acknowledgment or any form of suggestion that the matters form the related art already known to a person skilled in the art.

SUMMARY

The present invention provides a power control system and method for a hybrid vehicle capable of improving fuel economy of the hybrid vehicle by driving a motor with power higher than a power limit of a converter in an electric vehicle (EV) mode of the hybrid vehicle without regard to the power limit of the converter.

In accordance with the present invention, the above and other objects may be accomplished by a power control system for a hybrid vehicle that may include a high-voltage battery capable of being charged or discharged, a first motor and a second motor, a first inverter connected to the first motor, a second inverter connected to the second motor, a converter having a first side connected to the battery and a second side connected to the first inverter and the second inverter in parallel, a diode connected in parallel to both sides of the converter, and a controller configured to adjust the converter and the first and second inverters to cause electric power of the high-voltage battery to be bypassed via the diode and directly supplied to the first inverter or the second inverter.

In the exemplary embodiment of the present invention, the diode may include an anode connected to a positive terminal of the battery and a cathode connected to input terminals of the first inverter and the second inverter. When the hybrid vehicle is in an electric vehicle (EV) mode without driving an engine, the controller may be configured to operate a switch of the converter to cause electric power of the high-voltage battery bypassed via the diode to be directly supplied to the first inverter and the second inverter. In addition, when a required power value of the hybrid vehicle in the EV mode exceeds a power limit of the converter, the controller may be configured to operate the switch of the converter to cause electric power of the high-voltage battery bypassed via the diode to be directly supplied to the first inverter and the second inverter.

In the exemplary embodiment of the present invention, the converter may include an inductor having a first end connected to the battery and a switching element connected between a second end of the inductor and the input terminals of the first inverter and the second inverter, and, when the required power value of the hybrid vehicle in the EV mode exceeds the power limit of the converter, the controller may be configured to maintain the switching element in an ON state and supply current passing through the switching element of the converter and the diode to the first inverter and the second inverter.

In addition, the first motor may be connected to a first gear element of a planetary gear set of a transmission system provided within the hybrid vehicle, the second motor may be connected to a second gear element of the planetary gear set, an engine may be connected to a third gear element of the planetary gear set, and a driving shaft of the hybrid vehicle may be connected to the second gear element and the third gear element may be intermittently driven in the EV mode of the hybrid vehicle.

In the exemplary embodiment of the present invention, when the required power value of the hybrid vehicle in the EV mode exceeds the power limit of the converter, the controller may be configured to operate the switch of the converter to cause electric power of the high-voltage battery bypassed via the diode to be directly supplied to the second inverter to drive the second motor, shift torque and speed of the first motor connected to the first gear element in a direction opposite to that of torque and speed of the second motor as the third gear element is intermittently driven, and add power of a first motor to power of a second motor. In the exemplary embodiment of the present invention, the first gear element may be a sun gear, the second gear element may be a ring gear and the third gear element may be a carrier.

In accordance with an aspect of the present invention, the above and other objects may be accomplished by a power control system for a hybrid vehicle that may include a battery, a converter configured to convert a voltage level of the battery, first and second inverters connected to the converter in parallel to receive power of the converter, a diode having both ends connected to a connection node of the battery and the converter and a connection node of the converter and the first inverter to form a bypass path of the converter, a first motor connected to the first inverter and connected to a first gear set of a planetary gear set disposed within a transmission system of the hybrid vehicle, a second motor connected to the second inverter and a second gear element of the planetary gear set, and an engine connected to a third gear set of the planetary gear set, wherein the second gear element is connected to a driving shaft of the hybrid vehicle.

When the hybrid vehicle is in an electric vehicle (EV) mode, the third gear element may be driven intermittently, a switch of the converter may be operated to cause electric power of the high-voltage battery bypassed via the diode to be directly supplied to the second inverter to drive the second motor, torque and speed of the first motor connected to the first gear element are shifted in a direction opposite to that of torque and speed of the second motor as the third gear element is driven intermittently, and power of a first motor is added to power of a second motor.

In the exemplary embodiment of the present invention, the converter may include an inductor having a first end connected to the battery and a switching element connected between a second end of the inductor and input terminals of the first and second inverters, and, when the hybrid vehicle is in the EV mode, a controller may be configured to maintain the switching element in an ON state and supply current passing through the switching element of the converter and the diode to the first inverter and the second inverter. In the exemplary embodiment of the present invention, the first gear element may be a sun gear, the second gear element may be a ring gear and the third gear element may be a carrier.

In accordance with an aspect of the present invention, the above and other objects may be accomplished by a power control method of a hybrid vehicle that may include obtaining, by a controller, required power of the hybrid vehicle when the hybrid vehicle is in an electric vehicle (EV) mode, comparing, by the controller, the required power with a power limit of a converter configured to convert a voltage level of a battery as a power source for supplying motor driving power, and stopping converting of the voltage level using the converter when the required power exceeds the power limit and directly supplying power of the battery to a first inverter or a second inverter to drive a first motor connected to the first inverter and a second motor connected to the second inverter.

In the exemplary embodiment of the present invention, the supplying of the power may include supplying power to the first inverter and the second inverter via a diode having both ends connected to a connection node of the battery and the converter and a connection node of the converter and the first inverter or the second inverter to form a bypass path of the converter.

In the exemplary embodiment of the present invention, the first motor may be connected to a first gear element of a planetary gear set of a transmission system provided within the hybrid vehicle, the second motor may be connected to a second gear element of the planetary gear set, an engine of the hybrid vehicle may be connected to a third gear element of the planetary gear set, and the second gear element may be connected to a driving shaft of the hybrid vehicle, and the supplying of the power may include intermittently driving the third gear element, operating a switch of the converter to cause electric power of the high-voltage battery bypassed via the diode to be directly supplied to the second inverter to drive the second motor, shifting torque and speed of the first motor connected to the first gear element in a direction opposite to that of torque and speed of the second motor as the third gear element is driven intermittently, and adding power of a first motor to power of a second motor. In the exemplary embodiment of the present invention, the first gear element may be a sun gear, the second gear element may be a ring gear and the third gear element may be a carrier.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the exemplary embodiment of the present invention will be described in detail with reference to the accompanying drawings.

Figure 1:
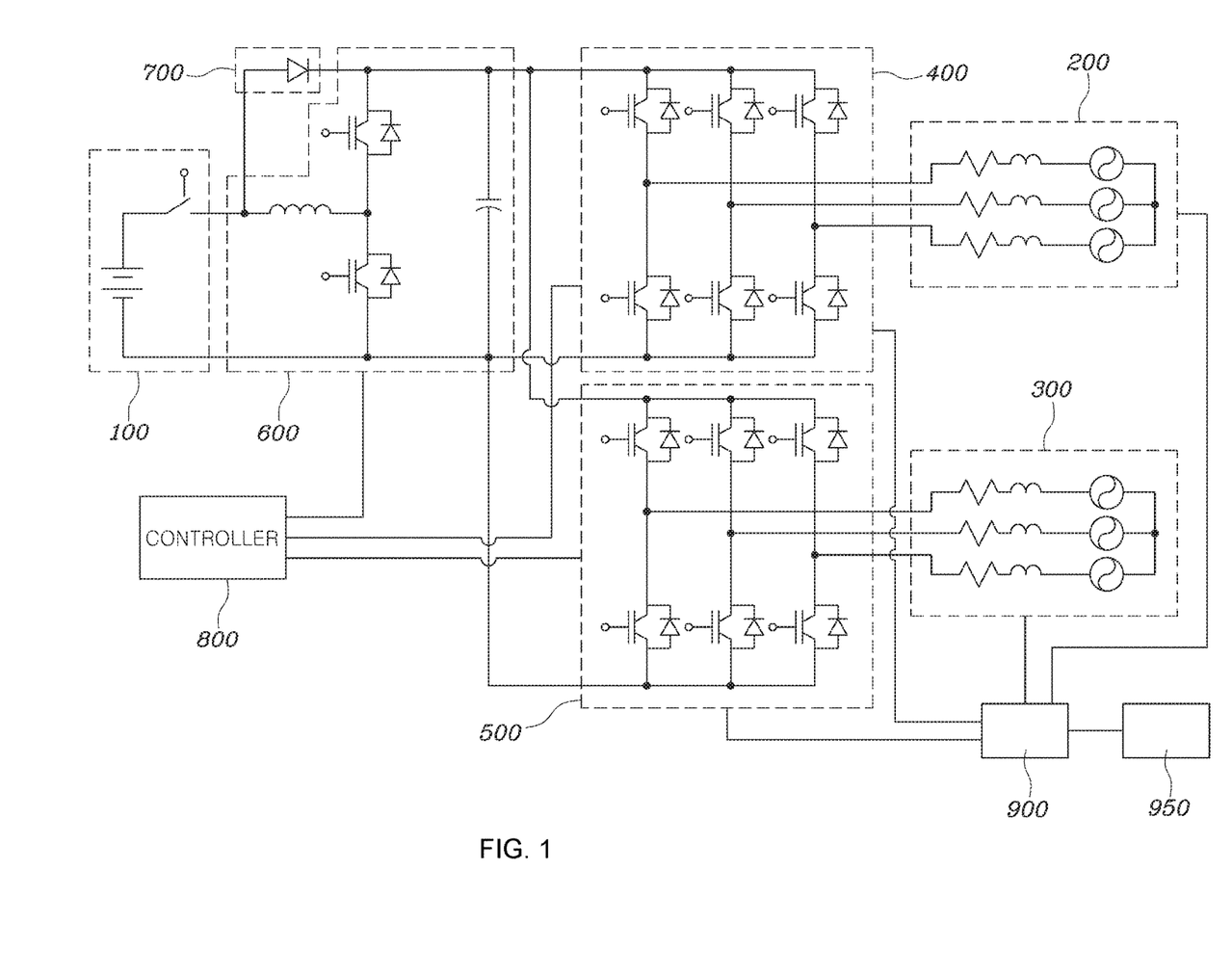
FIG. 1 is a diagram showing the configuration of a power control system for a hybrid vehicle according to an exemplary embodiment of the present invention.

A power control system for a hybrid vehicle according to the present invention may include, as shown in FIG. 1, a high-voltage battery 100 capable of being charged or discharged; a first motor 200 and a second motor 300; a first inverter 400 connected to the first motor 200; a second inverter 500 connected to the second motor 300; a converter 600 having a first side connected to the battery 100 and a second side connected to the first inverter 400 and the second inverter 500; a diode 700 connected to both sides of the converter 600 in parallel; and a controller 800 configured to adjust the converter and inverter gate voltages to cause power of the high-voltage battery 100 to be bypassed via the diode 700 and directly supplied to the first inverter 400 and the second inverter 500.

The diode 700 connected to the converter 600 in parallel may include an anode connected to a positive terminal of the battery 100 and a cathode connected to input terminals of the first inverter 400 and the second inverter 500, to thus determine the direction of current and the amount of current flowing in the converter 600 based on the voltage applied to the gate of the switching element configuring the converter 600.

An object of this system is to improve power of a vehicle by driving the motor without regard to the maximum power of the converter 600 when a hybrid vehicle travels in an electric vehicle (EV) mode. In the system according to the present invention, the controller 800 may be configured to control the ON/OFF state of the switching element included in the converter 600, to supply electric power of the high-voltage battery 100 to the first and second inverters 400 and 500 through the diode 700 connected in parallel to the converter 600 without passing through the converter 600, thereby driving the motor without regard to the power limit of the converter 600. Therefore, current from the high-voltage battery 100 is bypassed via the diode 700 without being influenced by parasitic components generated by ON/OFF of the switching element and the inductor included in the converter 600, thereby avoiding resonance generated by the inductor and the capacitor and decreasing electric power loss due to the parasitic components. Therefore, system efficiency may be increased.

Although the object of the present invention may be sufficiently achieved by performing control to cause current to flow through the diode 700 in the EV mode of the hybrid vehicle, since the diode 700 is not an ideal element and thus voltage drop may occur in the diode 700, current flowing from the high-voltage battery 100 to the inverters may not be applied only through the diode 700 due to presence of the diode 700. Accordingly, in the present invention, when the hybrid vehicle is in the EV mode, the controller 800 may be configured to adjust the gate of the switching element included in the converter 600 to prevent electric power of the high-voltage battery 100 from being subjected to voltage level conversion through the converter 60, thereby further supplying current to the first inverter 400 and the second inverter 500. The converter 600 may include a switching element such as an insulated gate bipolar transistor (IGBT) switching structure as shown in FIG. 1. In particular, when the gate voltage of the IGBT for determining an electrical connection state between the input and output terminals of the converter 600 is adjusted to maintain the IGBT in the ON state, the current of the battery may be supplied to the first inverter 400 and the second inverter 500 without passing through the inductor and the switching element included in the converter 600 without being subjected to voltage level conversion through the converter 600.

As a result, according to the present invention, when the hybrid vehicle is in the EV mode, since the electric power of the high-voltage battery 100 is delivered to the inverters without being subjected to voltage level conversion through the converter 600, resonance may not be generated due to the inductor of the converter 600 by switching and electric power loss may be prevented from being generated due to internal resistance of the converter 600. In addition, generally, since the converter 600 of the hybrid vehicle boosts the voltage of the high-voltage battery 100, heat may be generated upon boosting the converter 600. In contrast, in the present invention, since the voltage is not boosted using the converter 600, heat generation may be prevented and thus efficiency may be improved in terms of radiation of heat of the power module.

In the EV mode of the hybrid vehicle according to the exemplary embodiment of the present invention, generally, the controller 800 may be configured to adjust the gate voltage of the switching element of the inverter to cause the electric power of the high-voltage battery 100 to be bypassed via the diode 700 to be directly supplied to the first inverter 400. When the required power of the vehicle is sufficiently satisfied by the first motor 200 connected to the first inverter 400, the second inverter 500 and the second motor 300 are not required to be driven. Accordingly, in this case, the controller 800 may be configured to adjust the gate voltage of the second inverter 500 to switch the second inverter 500 off to cause electric power of the high-voltage battery 100 bypassed via the diode 700 not to be applied to the second inverter 500, such that the second motor 300 connected to the second inverter 500 is not driven. In response to determining that it is more efficient that electric power is supplied after boosting the voltage through the converter 600, the ON/OFF duty ratio of the switching element of the converter 600 may be adjusted to boost the voltage through the converter 600.

Meanwhile, when required power of the hybrid vehicle exceeds a power limit of the converter 600, additional power is required to satisfy the required power of the vehicle. In the related art, since the converter 600 is not capable of generating higher power, the engine of the vehicle should be driven to change the driving mode from the EV mode to the hybrid mode. In the related art, since the engine should be driven, fossil fuel is used, thereby decreasing fuel economy of the vehicle.

In addition, in the related art, to suppress engine driving to maintain the EV mode, the power limit of the converter 600 should be increased. However, changing the converter 600 to increase the power limit of the converter 600 means that boosting performance of the converter 600 is improved to satisfy infrequent requirements for increasing power. When an expensive high-performance converter is used to improve the boosting performance of the converter 600, efficiency decreases. In other words, using the high-performance converter to satisfy infrequent requirements for increasing the power is not preferable in terms of the cost and efficiency of the vehicle. However, according to the present invention, electric power received from the high-voltage battery 100 may be delivered to the second inverter 500 connected in parallel to the first inverter 400 without using the converter 600 to drive the second motor 300, thereby obtaining additional power.

Further, the second motor 300 is not necessarily driven through the second inverter 200, only when the required power of the hybrid vehicle exceeds the power limit of the converter 600. For example, even when the required power of the vehicle is satisfied by supplying electric power after boosting the voltage using the converter 600 to drive only the first motor 200 or by bypassing electric power via the diode without passing through the converter 600 to drive the first motor 200, upon determining that it is more efficient that the two motors 200 and 300 are driven using the power bypassed via the diode, the two motors 200 and 300 may be driven regardless of the required power of the vehicle. Simultaneously driving the first motor 200 and the second motor 300 to generate power may be achieved by a structural configuration of the motor, the engine and the transmission of the hybrid vehicle. In the following description, it may be assumed that the second motor 300 is a main motor having higher power than the first motor 200.

In the present invention, when the required power of the hybrid vehicle exceeds the power limit of the converter 600 predetermined in the controller 800, the controller 800 may be configured to control the gate of the switching element of the inverter to cause electric power of the high-voltage battery 100 bypassed via the diode 700 without passing through the converter 600 to be directly supplied to the first inverter 400 and the second inverter 500. The same voltage may be delivered to the second inverter 500 and the first inverter 400 connected in parallel to the second inverter 500 by the electric power of the high-voltage battery 100 bypassed via the diode 700, the controller 800 may be configured to adjust the gate voltages of the switching elements of the second inverter 500 and the first inverter 400 to deliver the electric power of the high-voltage battery 100 to both the first motor 200 and the second motor 300. Particularly, the operation of the first motor 200 and the second motor 300 may be determined based on the connection relationship between a transmission system 900, a motor, and an engine of the hybrid vehicle.

Figure 2:
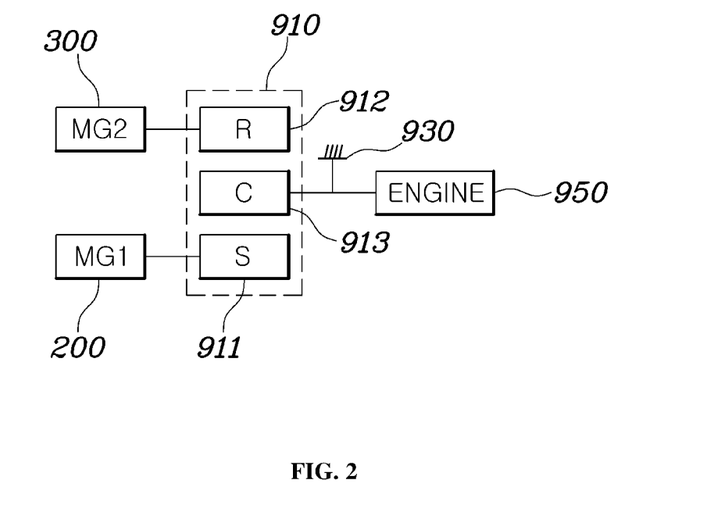
FIG. 2 is a diagram showing an example of a connection relationship between a motor, an engine and a planetary gear set provided in the power control system for the hybrid vehicle of FIG. 1 according to an exemplary embodiment of the present invention.

The hybrid vehicle may include an engine 950 for driving the vehicle and a transmission system 900 connected to the engine 950, the first motor 200 and the second motor 300 to deliver driving power of the engine 950, the first motor 200 and the second motor 300 to wheels. FIG. 2 is a diagram showing an example of a connection relationship between a motor, an engine and a planetary gear set provided within the power control system for the hybrid vehicle of FIG. 1, and FIG. 3 is a diagram illustrating a driving relationship between the motor and the engine according to the connection relation of the planetary gear set of FIG. 2.

As shown in FIG. 2, in the present invention, the first motor 200 may be connected to a sun gear 911 of a planetary gear set 910 within the transmission system 900, the second motor 300 may be connected to a ring gear 912 of the planetary gear set 910, and the engine 950 may be connected to a carrier 913 of the planetary gear set 910. In particular, the carrier 913 connected to the engine may be connected to a one-way clutch (OWC), a two-way clutch (TWC) or a brake for intermittent driving. In the present invention, the carrier 913 may be driven intermittently in the EV mode of the hybrid vehicle. The ring gear 912 connected to the second motor 300 which is the main motor may be connected to the driving shaft of the vehicle.

Figure 3:
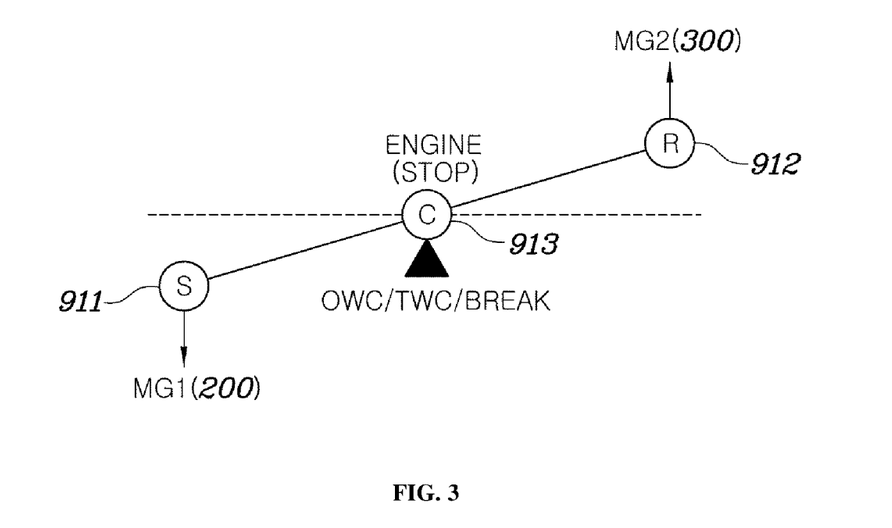
FIG. 3 is a diagram illustrating a driving relationship between the motor and the engine according to the connection relation of the planetary gear set of FIG. 2 according to an exemplary embodiment of the present invention.

The connection relationship between the planetary gear set 910, the motors 200 and 300 and the engine 950 may be illustrated by lines as shown in FIG. 3. In the power control system for the hybrid vehicle according to the present invention, since the carrier 913 connected to the engine 930 may be driven intermittently when the carrier 913 is disposed between the first motor 200 and the second motor 300, the first motor 200 and the second motor 300 may be driven in opposite directions with reference to the carrier 913. In other words, as the speed of the second motor 300 operating as a motor increases in a positive direction, the speed of the first motor 200 increases in a negative direction. When negative torque corresponding to the speed of the first motor 200 is applied to the first motor 200, positive power is generated according to a product of a speed having a negative value and torque having a negative value.

In the circuit shown in FIG. 1, the power of the first motor 200 connected to the sun gear 911 further decreases in FIG. 3 by applying power to the first motor 200, thereby increasing the power of the second motor 300. In other words, the first motor 200 may be driven by the power of the battery bypassed via the diode 700 without passing through the converter 600 to be delivered to the first inverter 400, and thus, the power of the first motor 200 may be added to the power of the second motor 300 which is the main motor, thereby increasing the total power of the hybrid vehicle in the EV mode.

Figure 4:
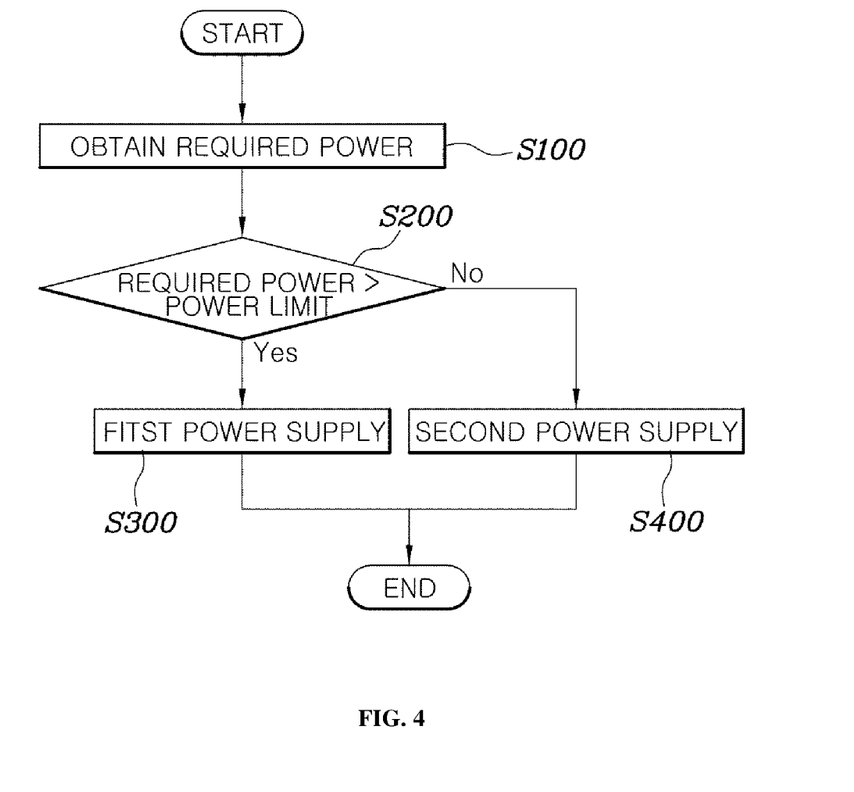
FIG. 4 is a flowchart illustrating a power control method of a hybrid vehicle according to an exemplary embodiment of the present invention.

The flowchart of the power control method for the hybrid vehicle implemented by the power control system for the hybrid vehicle is shown in FIG. 4. Referring to FIG. 4, the power control method for the hybrid vehicle of the present invention may include obtaining, by a controller, a required power in the EV mode of the hybrid vehicle (S100), comparing, by the controller, the required power with the power limit of the converter configured to convert the voltage level of the battery which is a power source for providing the motor driving power (S200), and stopping, by the controller, conversion of the voltage level of the converter, directly supplying the power of the battery to the first inverter or the second inverter and driving the first motor connected to the inverter and the second motor connected to the second inverter, when the required power is greater than the power limit (S300).

The above-described operation is similarly applicable to the case where the speed of the second motor increases in a negative direction (e.g., backward movement of the vehicle). In other words, when the speed of the second motor increases in the negative direction, negative torque corresponding to the negative direction is applied to the second motor and positive torque corresponding to a positive direction is applied to the first motor, such that the power of the first motor is added to the power of the second motor. Therefore, power may increase.

The above-described method corresponds to the control method of the power control system in which the required power of the vehicle is not sufficiently satisfied by the power limit of the converter 600 when the hybrid vehicle is traveling in the EV mode. In particular, in this control method, the engine connected to the carrier of the planetary gear set within the transmission system of the hybrid vehicle intermittently rotates and the first motor 200 connected to the sun gear and the second motor 300 connected to the ring gear are both driven, thereby increasing the power of the hybrid vehicle regardless of the power limit of the converter.

When the required power of the hybrid vehicle is equal to or less than the power limit, since driving of only the second motor 300 may be most efficient, the controller 800 may be configured to adjust the gate voltages of the switching elements included in the first inverter 400 and the second inverter 500 to switch the first inverter 400 off and switch the second inverter 500 on, thereby driving the second motor 300 (S400). The motor and the engine provided in the power control system for the hybrid vehicle of the present invention may be connected to the driving system of the vehicle in various manners in addition to the example of FIG. 2. FIGS. 5 to 8 show various connection relationships.

Figure 5:
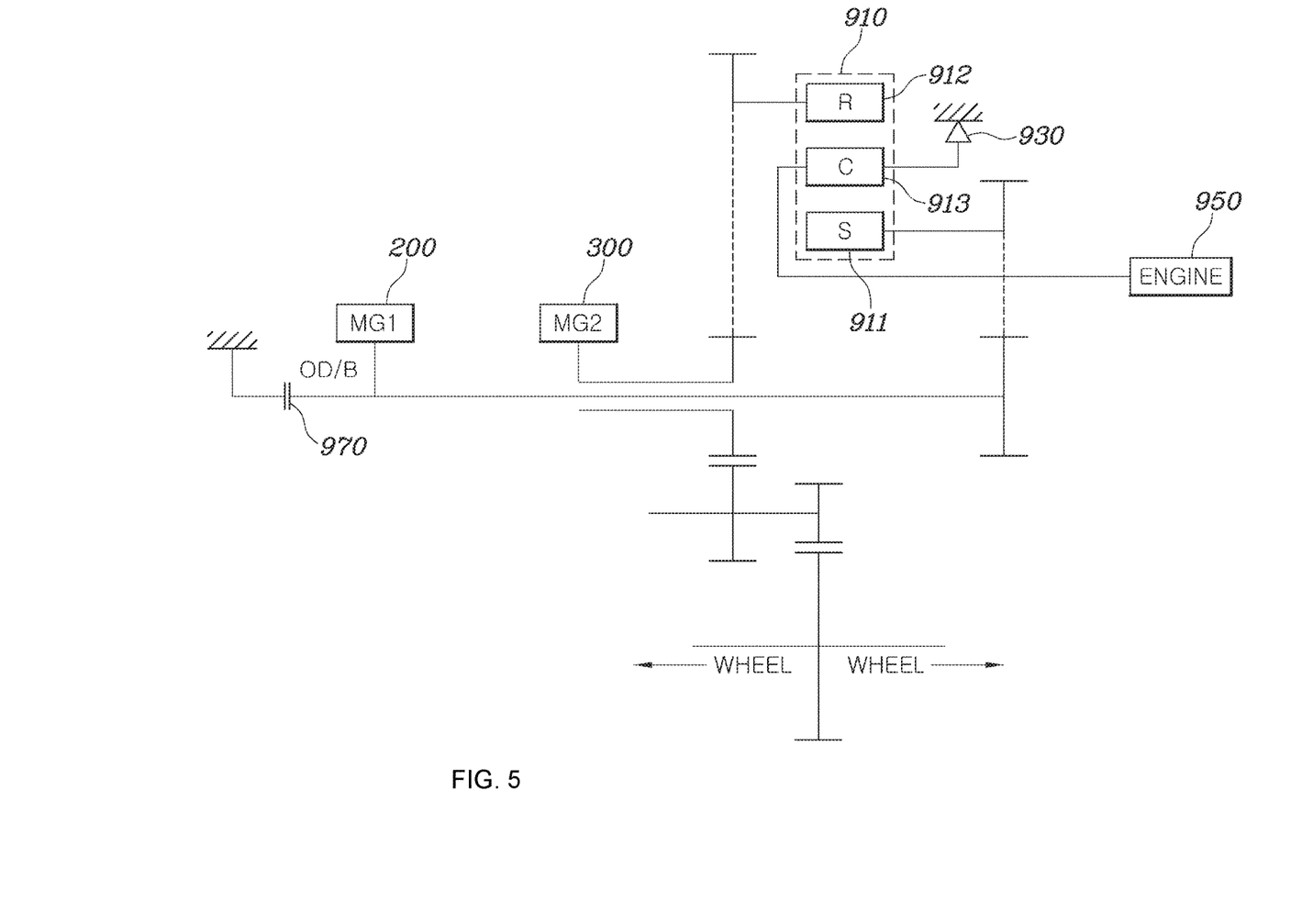
FIGS. 5 to 8 are diagrams showing the other examples of a connection relationship between a motor, an engine and a planetary gear set provided in the power control system for the hybrid vehicle of FIG. 1 according to an exemplary embodiment of the present invention.
Figure 6:
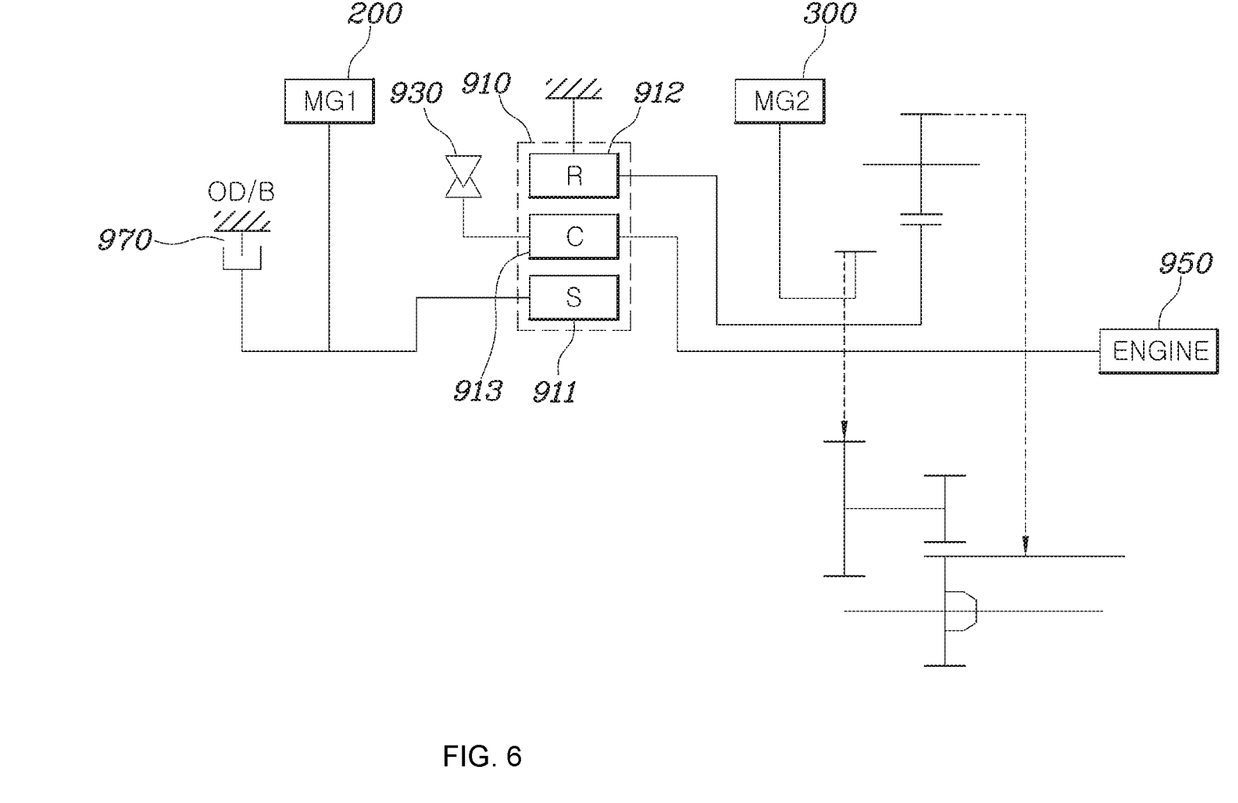
Figure 7:
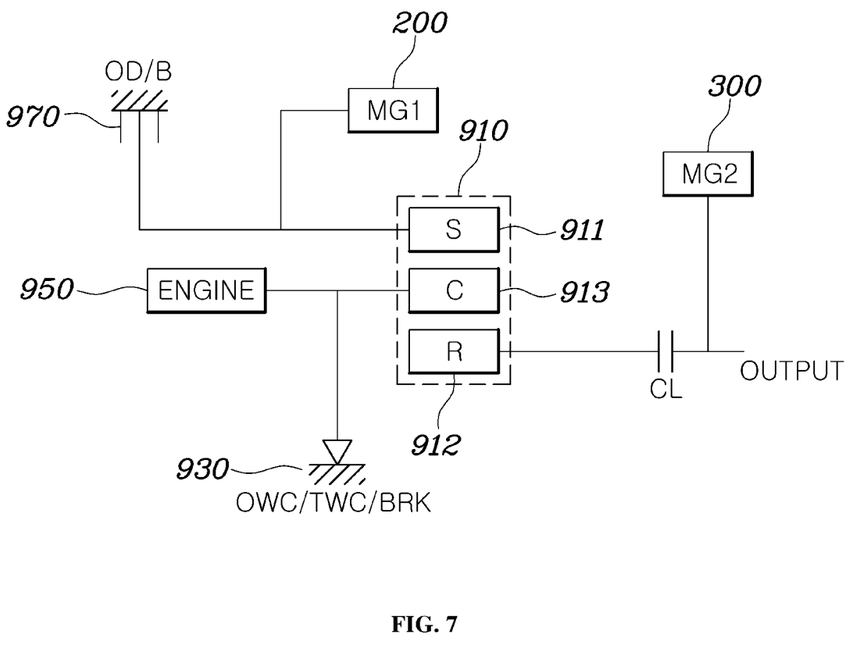

Although the motor, the engine, and the planetary gear set are connected in various manners in the examples shown in FIGS. 5 to 7, as shown in FIG. 2, the first motor 200 may be connected to the sun gear 911 of the planetary gear set 910 of the transmission system 900, the second motor 300 may be connected to the ring gear 912 of the planetary gear set 910, the engine 950 may be connected to the carrier 913 of the planetary gear set 910, and the ring gear 912 may be connected to the power shaft of the vehicle. In FIGS. 5 to 7, reference numeral "970" denotes overdrive/braking.

Figure 8:
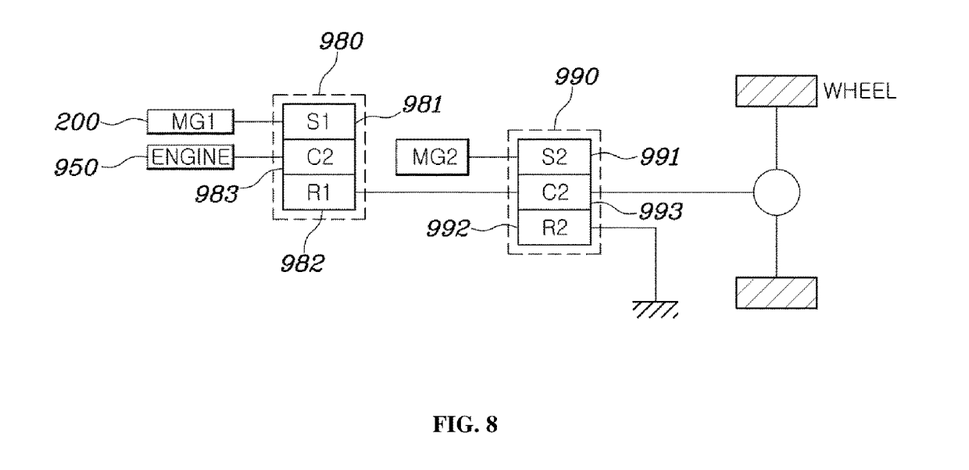

In the example shown in FIG. 8, two planetary gear sets 980 and 990 are used. In addition, a first motor 200 may be connected to a sun gear 981 of the first planetary gear set 980, an engine 950 may be connected to a carrier 983 of the first planetary gear set 980, and a ring gear 912 of the first planetary gear set 980 may be connected to a carrier 993 of the second planetary gear set 990. The second motor 300 may be connected to the sun gear 995 of the secondary planetary gear set 990 and the ring gear 991 of the second motor 300 may be fixed.

Figure 9:
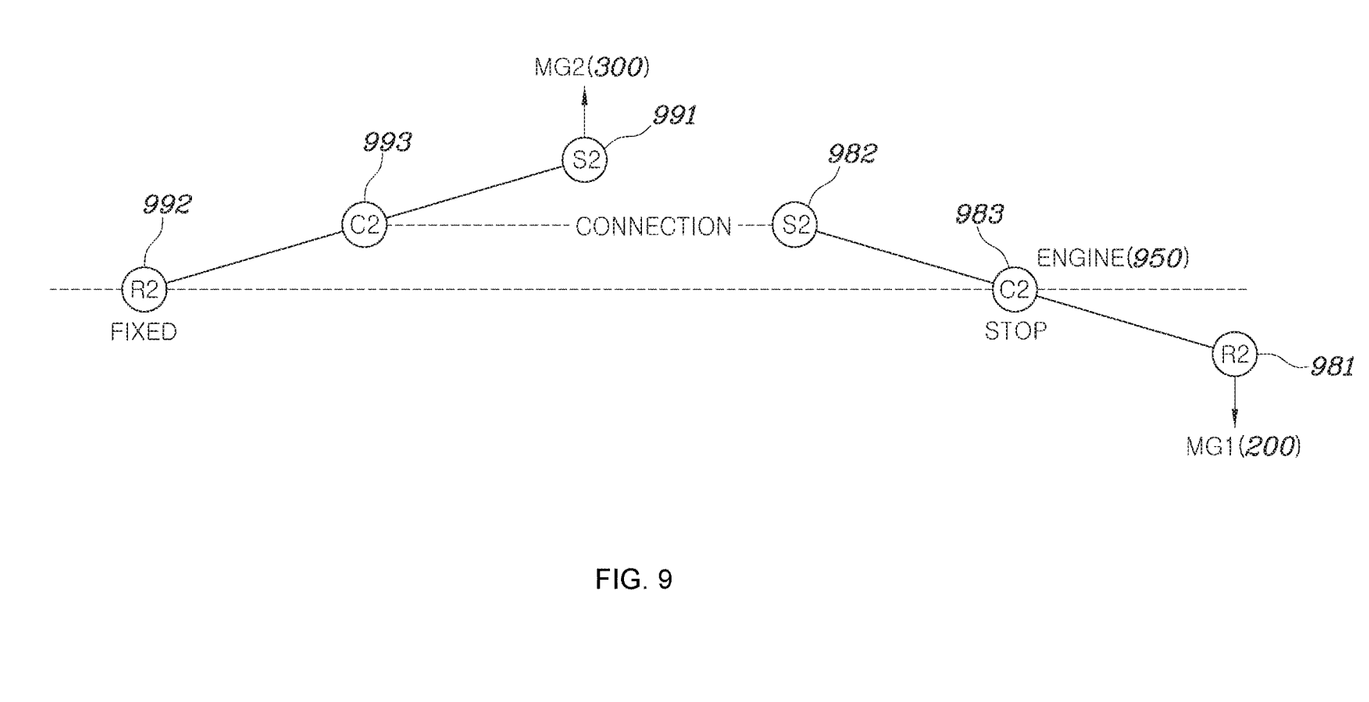
FIG. 9 is a diagram illustrating a driving relation between the motor and the engine according to the connection relation of the planetary gear set of FIG. 8 according to an exemplary embodiment of the present invention.

FIG. 9 is a diagram illustrating a driving relationship between the motor and the engine according to the connection relation of the planetary gear set of FIG. 8. As shown in FIG. 9, since the second planetary gear set 991 may be fixed and the ring gear 912 of the first planetary gear set 980 may be connected to the carrier 993 of the second planetary gear set 990, in the EV mode in which the engine 950 connected to the carrier 983 of the first planetary gear set 980 rotates intermittently, the rotation speeds and torques of the second motor 300 and the first motor 200 increase in opposite directions, similarly to the relationship described with reference to FIG. 2. Accordingly, as described with reference to FIG. 2, it may be possible to increase the power of the second motor by applying power to the first motor 200.

According to the present invention, the following effects may be obtained.

First, since all motors connected to a converter may be simultaneously driven in a hybrid vehicle without regard to a power limit of the converter, maximum power of the vehicle in an EV mode may be improved.

Second, since desired vehicle power may be obtained by driving a plurality of motors without boosting a voltage using a converter, heat loss generated due to driving of the converter may be prevented.

Third, since electric power of a battery may be directly applied to an inverter via a diode without using an internal circuit of a converter, it may be possible to improve efficiency of a power control system for a vehicle in an EV mode and also in a hybrid mode.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power control system for a hybrid vehicle, comprising:
   a high-voltage battery capable of being charged or discharged;
   a first motor and a second motor;
   a first inverter connected to the first motor;
   a second inverter connected to the second motor;
   a converter having a first side connected to the battery and a second side connected in parallel to the first inverter and the second inverter;
   a diode connected in parallel to both sides of the converter; and
   a controller configured to operate the converter and the first and second inverters to cause electric power of the high-voltage battery to be bypassed via the diode and directly supplied to the first inverter or the second inverter,
   wherein, when a required power value of the hybrid vehicle in an electric vehicle (EV) mode without driving an engine exceeds a predetermined power limit of the converter, the controller is configured to control a switch of the converter to cause electric power of the high-voltage battery bypassed via the diode to be directly supplied to the first inverter and the second inverter.

2. The power control system for the hybrid vehicle according to claim 1, wherein the diode includes an anode connected to a positive terminal of the battery and a cathode connected to input terminals of the first inverter and the second inverter.

3. The power control system for the hybrid vehicle according to claim 1,
   wherein the first motor is connected to a first gear element of a planetary gear set of a transmission system provided within the hybrid vehicle, the second motor is connected to a second gear element of the planetary gear set, and an engine is connected to a third gear element of the planetary gear set, and
   wherein a driving shaft of the hybrid vehicle is connected to the second gear element and the third gear element is driven intermittently in the EV mode of the hybrid vehicle.

4. The power control system for the hybrid vehicle according to claim 3, wherein, when the required power value of the hybrid vehicle in the EV mode exceeds the predetermined power limit of the converter, the controller is configured to control the switch of the converter to cause electric power of the high-voltage battery bypassed via the diode to be directly supplied to the second inverter to drive the second motor, shift torque and speed of the first motor connected to the first gear element in a direction opposite to that of torque and speed of the second motor as the third gear element is driven intermittently, and add power of a first motor to power of a second motor.

5. The power control system for the hybrid vehicle according to claim 3, wherein the first gear element is a sun gear, the second gear element is a ring gear and the third gear element is a carrier.

6. The power control system for the hybrid vehicle according to claim 4, wherein the first gear element is a sun gear, the second gear element is a ring gear and the third gear element is a carrier.

7. A power control system for a hybrid vehicle, comprising:
    a battery;
    a converter configured to convert a voltage level of the battery;
    first and second inverters connected in parallel to the converter to receive power of the converter;
    a diode having both ends connected to a connection node of the battery and the converter and a connection node of the converter and the first inverter to form a bypass path of the converter;
    a first motor connected to the first inverter and connected to a first gear set of a planetary gear set provided in a transmission system of the hybrid vehicle;
    a second motor connected to the second inverter and a second gear element of the planetary gear set; and
    an engine connected to a third gear set of the planetary gear set,
    wherein the second gear element is connected to a driving shaft of the hybrid vehicle, and
    wherein, when the hybrid vehicle is in an electric vehicle (EV) mode, the third gear element is driven intermittently, a switch of the converter is controlled to cause electric power of the high-voltage battery bypassed via the diode to be directly supplied to the second inverter to drive the second motor, torque and speed of the first motor connected to the first gear element are shifted in a direction opposite to that of torque and speed of the second motor as the third gear element is driven intermittently, and power of a first motor is added to power of a second motor.

8. The power control system for the hybrid vehicle according to claim 7,
    wherein the converter includes an inductor having a first end connected to the battery and a switching element connected between a second end of the inductor and input terminals of the first and second inverters, and
    wherein, when the hybrid vehicle is in the EV mode, a controller is configured to maintain the switching element in an ON state and supply current passing through the switching element of the converter and the diode to the first inverter and the second inverter.

9. The power control system for the hybrid vehicle according to claim 7, wherein the first gear element is a sun gear, the second gear element is a ring gear, and the third gear element is a carrier.

10. The power control system for the hybrid vehicle according to claim 8, wherein the first gear element is a sun gear, the second gear element is a ring gear, and the third gear element is a carrier.

11. A power control method of a hybrid vehicle, comprising:
    obtaining, by a controller, a required power of the hybrid vehicle when the hybrid vehicle is in an electric vehicle (EV) mode without driving an engine;
    comparing, by the controller, the required power with a predetermined power limit of a converter configured to convert a voltage level of a battery as a power source for supplying motor driving power; and
    stopping, by the controller, conversion of the voltage level through the converter when the required power exceeds the predetermined power limit and directly supplying power of the battery to a first inverter or a second inverter to drive a first motor connected to the first inverter and a second motor connected to the second inverter,
    wherein a switch of the converter is controlled to cause electric power of the battery bypassed to be directly supplied to the first inverter and the second inverter when the conversion of the voltage level through the converter is stopped.

12. The power control method of the hybrid vehicle according to claim 11, wherein the supplying of the power includes:
    supplying, by the controller, power to the first inverter and the second inverter via a diode having one end connected to a connection node of the battery and the converter and another end connected to a connection node of the converter and the first inverter or the second inverter to form a bypass path of the converter.

13. The power control method of the hybrid vehicle according to claim 11,
    wherein the first motor is connected to a first gear element of a planetary gear set of a transmission system provided within the hybrid vehicle, the second motor is connected to a second gear element of the planetary gear set, an engine of the hybrid vehicle is connected to a third gear element of the planetary gear set, and the second gear element is connected to a driving shaft of the hybrid vehicle,
    wherein the supplying of the power includes intermittently driving the third gear element, controlling the switch of the converter to cause electric power of the high-voltage battery bypassed via the diode to be directly supplied to the second inverter to drive the second motor, shifting torque and speed of the first motor connected to the first gear element in a direction opposite to that of torque and speed of the second motor as the third gear element is driven intermittently, and adding power of a first motor to power of a second motor.

14. The power control method for the hybrid vehicle according to claim 13, wherein the first gear element is a sun gear, the second gear element is a ring gear, and the third gear element is a carrier.

* * * * *